No. 748,308. PATENTED DEC. 29, 1903.
H. REISERT.
APPARATUS FOR THE REMOVAL OF SULFURIC ACID FROM WATER.
APPLICATION FILED FEB. 3, 1902.
NO MODEL.
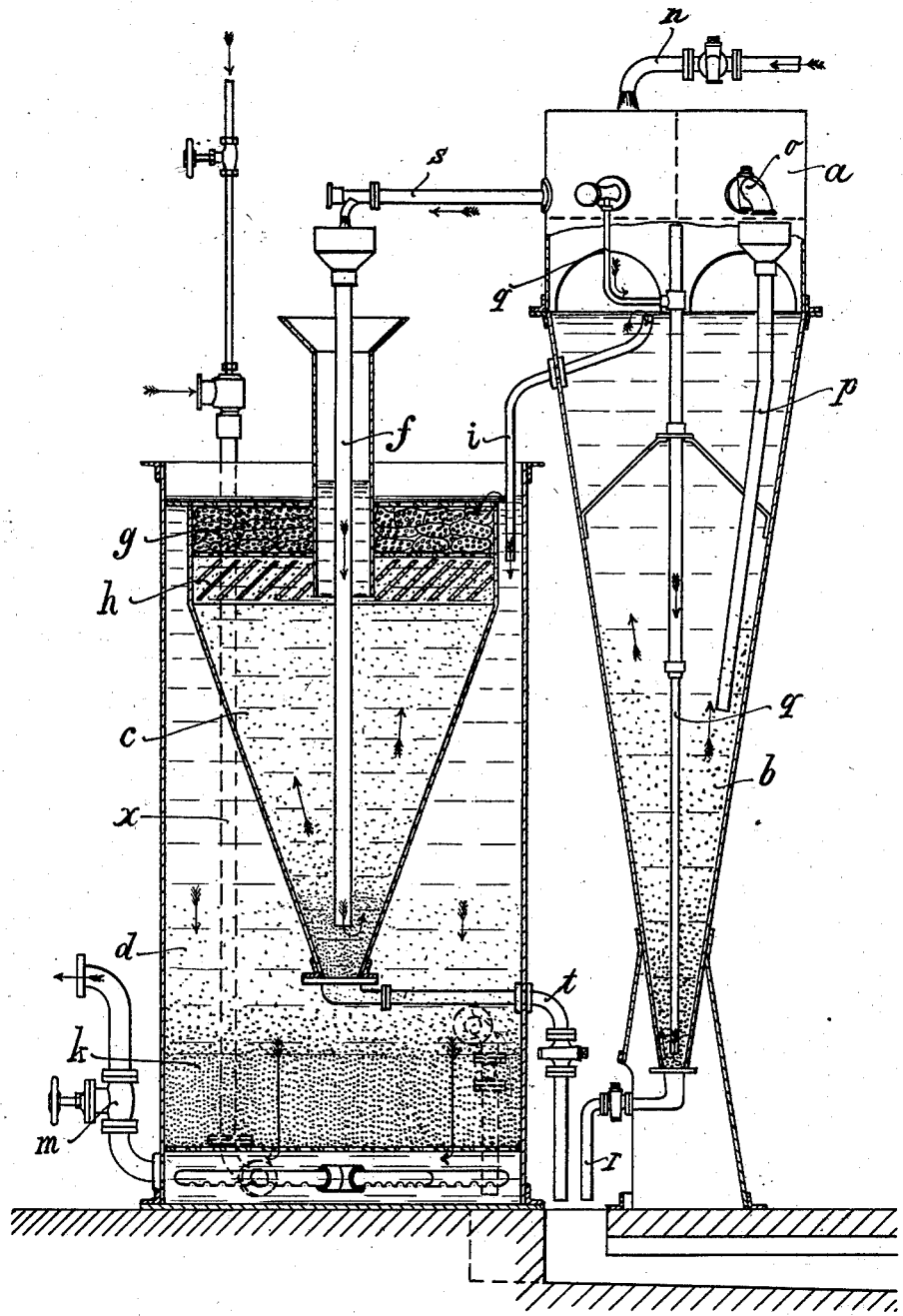
Witnesses:
Jean H Hofer
Elsbeth Mohrhauer
Inventor:
per Hans Reisert
Theodor Heese
Attorney.

No. 748,308. Patented December 29, 1903.

UNITED STATES PATENT OFFICE.

HANS REISERT, OF COLOGNE, GERMANY.

APPARATUS FOR THE REMOVAL OF SULFURIC ACID FROM WATER.

SPECIFICATION forming part of Letters Patent No. 748,308, dated December 29, 1903.

Application filed February 3, 1902. Serial No. 92,464. (No model.)

*To all whom it may concern:*

Be it known that I, HANS REISERT, a subject of the King of Prussia, German Emperor, residing at Cologne-on-the-Rhine, in the Province of the Rhine, Kingdom of Prussia, German Empire, have invented a new and useful Apparatus for the Removal of Sulfuric Acid from Water, of which the following is a specification.

In my application, Serial No. 92,465, relating to a process for the removal of sulfuric acid from water, which was filed February 3, 1902, together with the present application, there is described the method of passing boiler feed-water which contains calcium and magnesium bicarbonates through a pulpy mass of pulverized barium carbonate and separately removing the calcium and magnesium bicarbonates from the water. An apparatus for carrying out this process is the object of this invention.

Reference is had to the accompanying drawing, in which a longitudinal section of the apparatus is represented.

It is here assumed that the calcium bicarbonate is removed by means of quicklime in the form of saturated lime-water.

The apparatus consists of the following chief parts: A water-distributing tank $a$, a tank or vessel $b$ for the production of saturated lime-water, a tank $c$ for the barium-carbonate bath, and a tank $d$, in which the removal of the calcium and magnesium bicarbonates is effected.

The water to be purified enters the apparatus through the pipe $n$, through which it flows into the distributing-tank $a$. From this tank $a$ a certain quantity of the water, which quantity is regulated by means of the cock $o$, flows through the pipe $p$ into the funnel-shaped tank $b$, which contains in its lower part hydrate of lime. In order to saturate this water entering the tank $b$ with hydrate of lime, a pipe $q$ is provided, which leads from the distributing-tank $a$ nearly to the bottom of the tank $b$. The water flowing through this pipe stirs the hydrate of lime up and causes the same to be more quickly dissolved in the water. The sludge gathering at the bottom of the tank $b$ can be removed through the pipe l. Another part of the raw water flows through the pipes $s$ and $f$ into the lower part of the tank $c$, passes upward through the barium-carbonate bath, and through a filter $g$, before which, according to requirements, a clarifying apparatus $h$ is arranged and flows, clear and free from sulfuric acid, into the tank $d$. Into this tank a requisite quantity of saturated lime-water is introduced from the saturating-tank $b$ through the pipe $i$ for the removal of the calcium and magnesium bicarbonates. The water now passes through the tank $d$ downward and reaches, after the decomposition of the calcium and magnesium bicarbonates has been effected, the sand or gravel filter $k$, below which, in a well-known manner, a device $x$ for pressing air through the filter for cleansing purposes is arranged. This filter keeps back the sludge and the water leaves the apparatus through the pipe $m$. The sludge gathering at the bottom of tank $c$ can be removed through the pipe $t$.

The filter $g$ and the clarifying apparatus $h$ are not absolutely essential, provided that for the interaction of the barium carbonate and the sulfuric-acid compounds in the water a tank $c$ be used which becomes wider toward the top and which is sufficiently large in cross-section. It is already known that by means of a tank which becomes wider toward the top the water can be saturated with a soluble salt in the most perfect manner, for the reason that the undissolved particles in the water continually sink back into the lowest, narrowest part of the tank and are consequently again carried upward, so that not only is complete saturation attained, but the water on leaving the tank is also perfectly clear. A similar effect is produced when, as in the process under discussion, the barium carbonate is put into a tank widening toward the top and the water which is to be freed from sulfuric acid in combination is introduced at the bottom. The interaction between the barium-carbonate and the sulfuric-acid compounds in the water takes place in such a way that the precipitated insoluble substances, essentially barium-sulfate and carbon-dioxid compounds, remain at the bottom entirely of their own accord, while the water leaves the tank at the top perfectly clear and of course free from the sulfuric acid that was in combination in it, no special clarifying contrivance or filter being necessary.

What I claim as my invention, and desire to secure by Letters Patent of the United States, is—

An apparatus for the removal of sulfuric acid from water consisting of a vessel $c$ for a barium-carbonate bath, a vessel $d$ for the removal of the calcium and magnesium bicarbonates, vessel $c$ being arranged within vessel $d$, a filter $g$ provided at the top of vessel $c$, a filter $k$ provided at the bottom of vessel $d$, a pipe $f$ for leading the water to the bottom of vessel $c$, means for leading the water from the top of vessel $c$ to vessel $d$, a vessel $b$ for the production of saturated limewater, and a pipe $i$ connecting the vessels $b$ and $d$, as and for the purpose set forth.

In testimony whereof I have signed my name to this specification in the presence of two subscribing witnesses.

HANS REISERT.

Witnesses:
JOH. SCHOLZ,
CARL SCHMITT,